Sept. 7, 1954

E. C. HURT 2,688,168

METHOD OF AND APPARATUS FOR APPLYING WELDED-ON METAL COATINGS

Filed Nov. 15, 1950

INVENTOR
ELDON C. HURT
BY
D. C. Harrison
ATTORNEY

Sept. 7, 1954              E. C. HURT              2,688,168
METHOD OF AND APPARATUS FOR APPLYING
WELDED-ON METAL COATINGS
Filed Nov. 15, 1950                               2 Sheets-Sheet 2
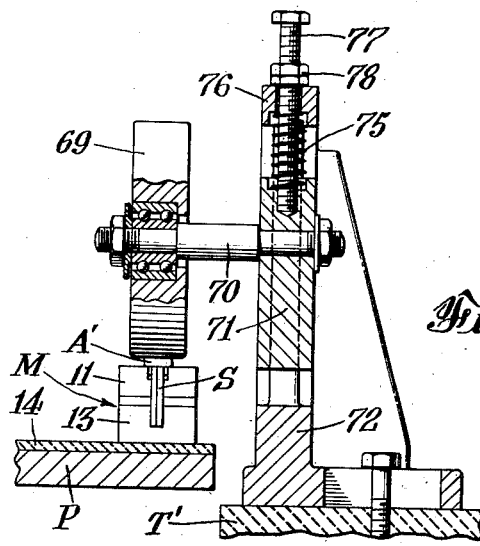
Fig. 3.
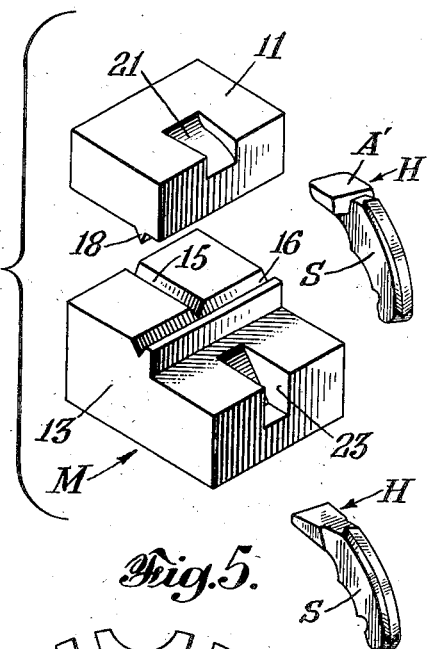
Fig. 4.
Fig. 5.
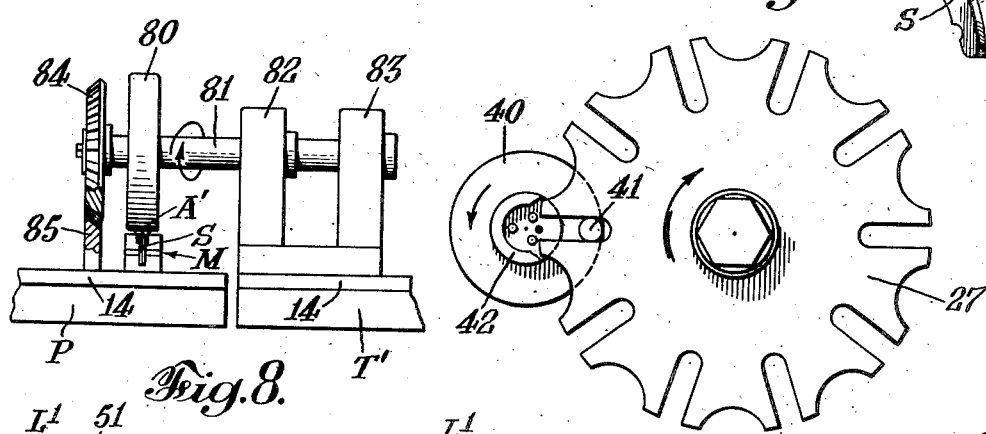
Fig. 8.
Fig. 6.
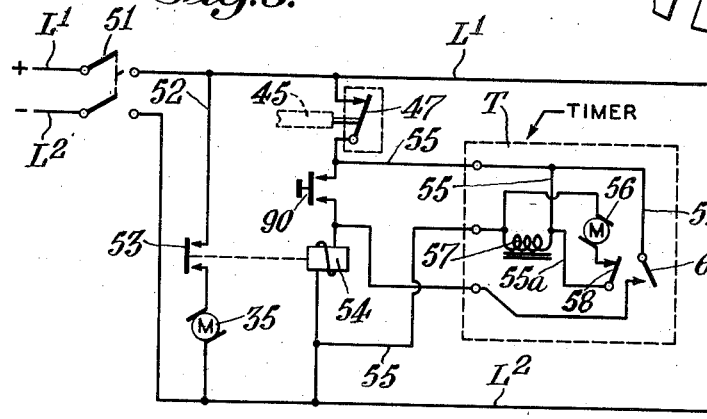
Fig. 7.
INVENTOR
ELDON C. HURT
BY
*D.C. Harrison*
ATTORNEY Patented Sept. 7, 1954

2,688,168

UNITED STATES PATENT OFFICE 2,688,168

METHOD OF AND APPARATUS FOR APPLYING WELDED-ON METAL COATINGS

Eldon Carter Hurt, Kokomo, Ind., assignor to Union Carbide and Carbon Corporation, a corporation of New York Application November 15, 1950, Serial No. 195,887

6 Claims. (Cl. 22—58)

This invention relates to a novel method and apparatus whereby uniform welded-on overlays, coatings or facings readily may be applied to working surfaces of metal articles. It has especial utility for the deposition upon the main cutting surface, the top surface, and at least two lateral surfaces of saw bits and similar articles of irregular shape, of uniform relatively thin welded-on overlays of wear-resistant metals and alloys such as those of the class of non-ferrous alloys composed of cobalt, chromium and tungsten. For convenience, the following description is directed principally to this application of the invention.

The cutting surfaces of insert saw bits have been provided with welded-on overlays of protective metal by a manual fusion welding operation using an oxy-acetylene torch or the equivalent to supply the welding heat. Not only is the manual procedure slow and laborious when surfacing these relatively small articles but slight variations in the technique employed by even an expert operator may result in an inferior product. Moreover, in a manual welding operation slight overheating of the metal of the bit during the welding operation results in excessive interalloying of the matrix metal and overlay metal, thereby providing zones of weakness in the layer of overlay metal. Insufficient heating of the matrix metal and overlay metal may result in insufficient bonding thereof, and the production of an inferior product.

Attempts to apply manually overlays of protective metal to insert saw bits by supporting the latter in molds and flowing molten metal into contact with the surfaces to be coated have given unsatisfactory results, primarily because the high surface tension of the molten protective metal prevents the small amount of the molten metal required for each saw bit from flowing freely over the uppermost surface of the article and into the space between the adjacent margins of the mold cavity and to the lateral surfaces of the saw bit head. Such an erratic welding operation did not lend itself to the use of semi-automatic apparatus or to the production of a succession of uniform welded products of acceptable quality.

Among the more important objects of the invention are the following: to provide in novel manner for applying a welded-on overlay of a protective metal upon the main working surface and contiguous surfaces of an article of irregular shape such as an insert saw bit; to provide in novel manner for distributing a molten body of a protective metal upon a main working surface and adjacent portions of at least two contiguous lateral surfaces of an article under conditions preventing undue interalloying of the protective metal and the matrix metal of the article; to provide in novel manner for the production of a succession of articles having substantially identical welded-on metal overlays distributed upon the aforesaid surfaces; and to provide a novel process and apparatus for the semi-automatic production of such surfaced articles in a continuous manner. These and other objects will be apparent from the following description.

In the accompanying drawings, illustrating certain modifications of the invention, Figure 1 is a vertical section through the general apparatus assembly taken along the line 1—1 of Figure 2, looking in the direction of the arrows, parts being broken away, and other parts omitted;

Figure 3 is a vertical section taken along the line 3—3 of Figure 2, looking in the direction of the arrows;

Figure 4 is an exploded view in perspective of a two-piece refractory mold and an insert saw bit carrying a pellet of an overlay metal;

Figure 5 is a perspective view of a saw bit having a welded-on overlay of protective metal;

Figure 6 is a view taken along the lines 6—6 of Figure 1, looking in the direction of the arrows, parts being omitted;

Figure 7 is a schematic view of electrical control circuits and interassociated parts embodying the invention; and Figure 8 is a side view of a modified form of overlay metal distributing mechanism.

Figure 1:
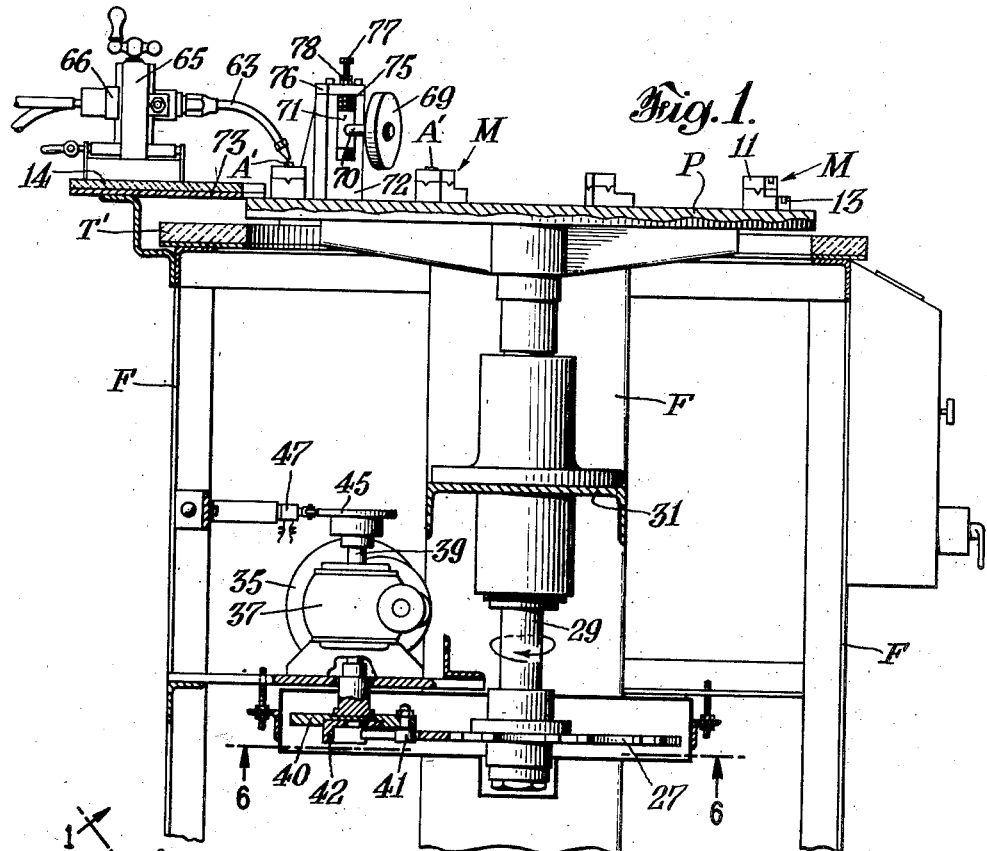

Referring to the accompanying drawings, wherein is illustrated one preferred embodiment of the invention, the apparatus comprises a plurality of spaced mold assemblies M each adapted to support an insert saw bit with the bit head uppermost and mounted upon a rotatable table P. In the form shown, each mold assembly is formed of two quickly-detachable sections 11, 13 of a heat-resistant material such as carbon, graphite, high temperature ceramic material, or alloys that can be molded and machined, such as the usual stainless steels. Each mold section 13, which conveniently may be made of copper, is secured in suitable manner to the table P. The table P and the shelf 73 supporting the torches hereinafter described preferably have thereon layers 14 of Transite or similar heat-resistant refractory. The top section 11 is removably supported on section 13. Grooves 15 and 16 in mold part 13 receive ridges 17 (not shown) and 18 formed in part 11 and keep the parts 11 and 13 in alignment during the various operations. The molds or mold sections preferably are made from metal by the well-known precision casting technique using the investment molding process. Such a procedure is disclosed in the October 1944 issue of "American Foundryman," pages 7-15.

Aligned mold cavities 21, 23 are formed in mold sections 11, 13, the integrated cavities having the same general contour as the lower surfaces of the saw bits. The walls of cavity 21 taper outwardly in a direction away from the saw bit shank S, and the lower surface of the cavity slopes upwardly in the same direction, as shown in Figures 3 and 4. The cavities 21 and 23 are sufficiently wide to house loosely the shank S and working head H of a saw bit and to support the bit in selected position with the top or uppermost working surface of the bit head approximately $\frac{1}{32}$ inch or more below the upper level of mold section 11 and with each side of the bit head spaced about $\frac{1}{32}$ inch or more from the contiguous wall of the mold. Cavity 23 is commonly about 0.010–0.015 inch wider than the shank of the saw bit.

Before placing the saw bit in the mold a shelf about $\frac{1}{32}$ inch deep is ground in the top surface of the saw bit head, if and when desired, which groove is filled with overlay metal during the welding operation.

For rotating the table P at uniform intervals through a selected arc and for intermittently maintaining each mold M at rest at a work station during a selected period of time, a ten-position Geneva motion plate 27 of well-known design is secured to a shaft 29 which, in turn, is secured to table P and lies in the axis of rotation of the latter. The shaft 29 is rotatably supported on bearings carried by a bracket 31 on frame F.

For rotating the table P, a motor 35 having a magnetic brake (not shown) is connected, through a reduction gear 37, with a driven shaft 39 having secured thereon a Geneva motion drive cam 40 provided with a drive pin 41 and a locking roller 42 of well-known type. The locking roller cooperates with the outer margin of the Geneva motion plate 27 in well-known manner during operation of motor 35 and functions periodically to hold the plate 27 stationary for a fixed period and then to release the plate 27 at the time the drive pin 41 enters a slot in the plate and drives the plate through a selected arc. As the pin leaves the plate the rotation of the plate is prevented by entry of the leading end of the locking roller into a curved groove in the plate.

The upper end of the driven shaft 39 of the reduction gear has secured thereto a cam member 45 cooperating with a normally closed microswitch 47 in the electric circuit driving the motor 35. The arrangement of parts is such that each time the shaft 39 makes one complete revolution the cam opens the microswitch momentarily and cuts off the electric current to motor 35, while energizing the magnetic brake to stop the motor.

The electric circuits for rotating the table intermittently through a selected arc and for holding a mold assembly at a work station for a preselected time are shown in Figure 7. The load circuit comprises feeder line L¹, main switch 51, a line 52 having therein the motor 35, a normally open switch 53 controlled by a solenoid 54, and feeder line L². The control circuit comprises line L¹, normally closed microswitch 47, a line 55 having therein a timer T of well-known design, and line L². The timer has arranged in parallel circuits (1) line 55 having therein an electromatic relay 57 for operating the timer motor clutch; (2) line 55a having therein a synchronous motor 56 and a normally closed switch 58; and (3) a line 59 having therein a normally open switch 60 and the solenoid 54. All three control circuits are connected with line L².

The arrangement of parts is such that when switch 51 is closed, current flowing past the microswitch 47 energizes the timer motor 56. When the preset time cycle or interval is completed, switch 58 of the timer is opened and switch 60 is closed, energizing solenoid 54 and closing switch 53 whereby the motor 35 is actuated. After one revolution of the driven shaft 39 of the reduction gear cam 45 momentarily opens the circuit at the microswitch 47, breaking the circuit to the timer. The latter then automatically resets under action of a spring (not shown), opening switch 60, deenergizing solenoid 54, cutting off current to motor 35, and closing switch 58. The microswitch 47 then closes; and the operations are repeated. One timer useful with this invention is that being marketed by The R. W. Cramer Company, Inc., of Centerbrook, Connecticut, under the trade name "Time delay relay type TEC, style A-WD-249."

For supplying preheat and welding heat to the articles receiving the welded-on overlays there is supported, for adjustment in a plurality of planes, at each of a succession of preheating and welding stations to which each successive mold and article carried thereby is brought in turn during operation of the apparatus, a welding torch 63 having the usual mixing chamber and means for conducting a fuel gas and oxygen to the latter. Each torch may have the usual cooling jacket and associated means for cooling the torch and torch tips, and the usual means for regulating the ratio of oxygen to fuel gas and for adjusting the pressure of each gas flowing to the torches.

In the form shown three preheating torches and one welding torch are disclosed. However, one or more such torches can be used, less effectively.

Each torch 63 is supported for vertical adjustment and for angular adjustment on a standard 65 mounted on a bracket 66 carried by shelf 73 and movable toward and from table P. Each torch is adapted to impinge high temperature flames upon the upper surface of the head of the saw bit and upon a small pellet or body of the protective metal of selected shape and mass positioned upon the bit head.

The torches hereindescribed preferably are of the oxy-fuel gas type, using mixtures of oxygen and acetylene. The proportion of fuel gas to oxygen flowing to the respective torches is preferably adjusted to provide a gas mixture or mixtures wherein the volume of oxygen is less than that required for complete combustion of the fuel gas. The flames produced by the combustion of such mixtures are referred to as "excess fuel gas flames" and as "carburizing flames."

For redistributing the molten protective metal A' in welding contact with the top and sides of the saw bit head forming the cutting edges thereof and for smoothing the surface of the overlay, there is provided at a point in the path of travel of each mold leaving the final welding station at which the overlay metal is still flowable a metal roll 69, preferably 4 inches or more in diameter, which, in the form shown in Figure 3, is mounted for free rotation on ball bearings on a shaft 70 secured at one end to a metal block 71. The latter is mounted for vertical adjustment in grooves in a bracket 72 mounted on the top T" of frame F. The bracket base has slots cooperating with bolts permitting locking adjustment of the bracket toward and from the table P, as shown in Figure 2.

For adjusting the height of the roll above the work an adjusting bolt 77 is threaded through a plate 76 secured to bracket 72 and has an end thereof extending freely, within a well in block 71. Nuts 78 permit locking of the block 71 in selected position. A compression spring 75 is operatively interposed between the block 71 and plate 76 and yieldingly resists any upward movement of the roll 69 as it moves over the molten overlay metal on a saw bit.

Figure 2:
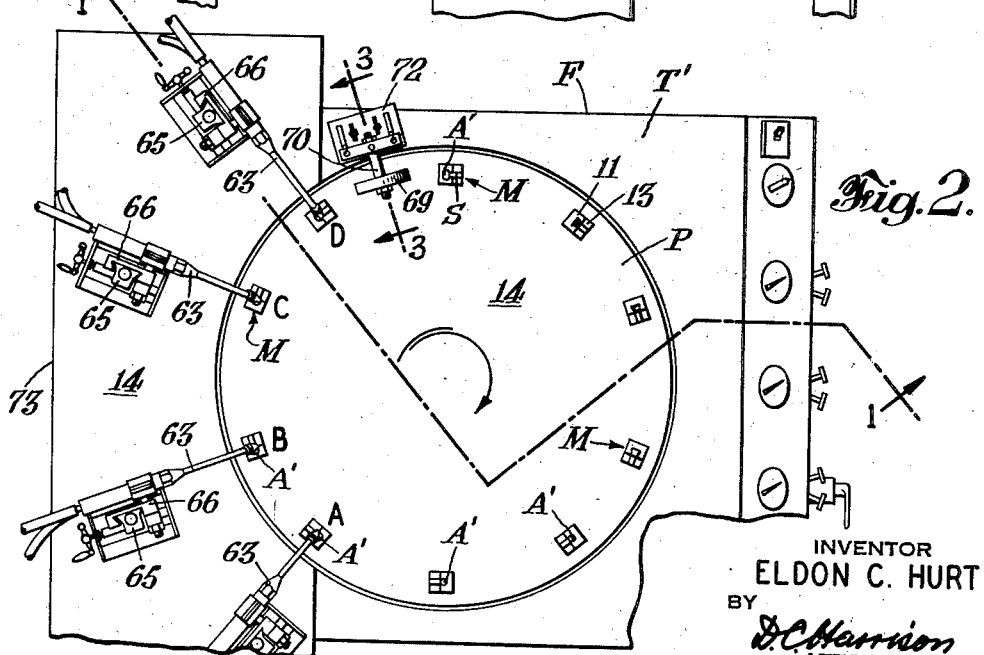
Figure 2 is a plan view of the apparatus, parts being broken away.

The idler roll 69 shown in Figures 1 to 3 serves effectively the purposes hereindescribed by mere light frictional rolling contact with the top surface of the molten overlay metal passing beneath the roll. However, the roll may advantageously be driven by other means with equally effective results. Thus, as shown in Figure 8, the roll may be a driven roll 80 secured upon a shaft 81 that is rotatable in brackets 82, 83, one end of the shaft having a pinion 84 meshing with a curved rack 85 secured upon the table P, thus using the movement of the table for driving the roll. The rack may lie only at points between the molds or it may extend completely around the table. If desired, a friction roller riding upon and driven by the table P can be substituted for the rack and pinion. Also, the roll 80 can be driven at the same speed as the table by means of a motor or the equivalent in any suitable manner.

In the practice of the invention utilizing apparatus of the type described, assuming that respective molds housing saw bits to be surfaced and carrying pellets of overlay metal have just moved to each of the preheating stations A, B and C and to the welding station D, as shown in Figure 2, and that the preheating and welding torches are lighted and playing upon the heads of the saw bits in the molds, and the microswitch is closed, the timer is actuated. The various torches are so adjusted that the article at each station is progressively heated and that the article at the welding station reaches a welding temperature and the overlay metal is melted and welded to the article at substantially the end of the time cycle for which the timer is set.

After the lapse of the time cycle found suitable for bringing the overlay metal on the article at the welding station to a molten condition, the timer motor 56 cuts out and switch 60 of the timer closes, closing switch 53 and actuating the motor 35 which rotates the table so as to bring each mold and article to the next succeeding station.

As the mold and article carrying the globule of molten overlay metal leaves the welding station it moves into the path of the roll 69 which imposes momentarily upon the molten surface of the overlay metal a light rolling pressure or force which overcomes the surface tension of the molten metal and presses it upon the uppermost surface of the saw bit head and into the spaces between the adjacent margins of the mold cavity and the lateral surfaces of the saw bit head.

The light rolling pressure applied by roll 69, and the action of the roll in withdrawing heat from the redistributed overlay metal, insure the deposition of a smooth welded-on layer of overlay metal of selected thickness upon the working surfaces of the saw bit head. A component of the force applied is perpendicular to the free surface of the overlay metal.

When the mold and the resurfaced saw bit reach the next succeeding station the microswitch 47 opens momentarily under action of cam 45, whereupon the timer switch opens, switch 58 closes, the timer resets, and motor 35 stops. The operations are repeated when the microswitch again closes. The timer can be bypassed, when desired, by closing a switch 90 disposed in a circuit that includes $L^1$, microswitch 47, solenoid 54, and line $L^2$.

In preparation for the surfacing operation, a saw bit is so placed in a mold that the top surface of the bit head is uppermost and is centered so that the space between the sides of the bit head and the adjacent walls of the cavity in the mold block 11 are approximately equal. A pellet or disc A' of a protective metal, such as a non-ferrous alloy composed principally of cobalt, chromium and tungsten, of the selected size and weight is placed upon the top of the bit head. As the table P is moved intermittently through successive selected arcs, the saw bit and pellet in each mold receive for selected periods the flames from successive torches A, B, C and D. Thereafter, the saw bit and overlay metal cool, and the bit then is removed from the mold at a subsequent station.

The reducing flames from the torches in the first and second stations A and B preferably are directed to impinge upon the part of the saw bit where the shank joins the head, thus preheating the body of the saw bit. The reducing flames at station C preferably are directed upon the pellet of protective metal so as to initiate melting of the pellet and cause the metal to weld to the top surface of the bit head. At the welding station the flames are directed upon the molten metal, causing it to flow somewhat and portions thereof to bond to the sides of the bit head. As the saw bit is indexed from station D to the next succeeding station, it moves under the relatively cool metal-redistributing roll 69 where the molten overlay metal is subjected to a preselected light rolling or wiping pressure or force before substantial modification or oxidation of the metal can occur. This overcomes the normal surface tension of the overlay metal, forces it from its generally globular shape, moves a layer thereof of selected thickness into welding contact with the top of the bit head, and moves the excess overlay metal into the spaces between the top, sides and curved bottom surfaces of the bit head and the adjacent surfaces defining the mold cavity and into welding contact with these surfaces of the bit head. The period of contact of the roll 69 and the molten overlay metal is very brief; and yet there appears to be a definite chilling effect upon the molten overlay metal as a result of such contact.

The period of dwell of the mold and article carried thereby at each of the stations is the same and, in the form of the invention illustrated in Figures 1 and 6, is controlled by the design of the Geneva motion mechanism and the speed of motor 35. The elapsed time during which a mold remains at each station can be varied, and is controlled by the timer.

The time interval required for the overlay-applying operation is determined by the amount of heat that is introduced into the saw bit and the overlay metal pellet at each of the preheating stations. Actually, all of the required heat can be applied to the article and pellet at a single welding station by the use of a plurality of suitable independently-controlled flames directed upon the body of the saw bit and the pellet of overlay metal. This is accomplished, however, at the expense of considerable loss in the speed of the operation and in the flexibility of the process.

By the practice of this invention, saw bit heads have had the top, side and end surfaces thereof provided with welded-on overlays of a protective metal at a rate of 360 or more pieces per hour, whereas when the overlay metal is applied manually, the operator has difficulty in maintaining a rate of 80 pieces per hour. Moreover, with this invention operator fatigue is reduced, and the shape and weight of the overlay metal on each successive saw bit are substantially the same and do not vary from bit to bit, according to the skill and judgment of each operator.

In one modification of the invention the apparatus was so designed and controlled that the output shaft 39 revolved once in 4 seconds. Movement of a mold from one station to another required 1 second, since the cam pin 41 engages the Geneva plate slot for one quarter revolution of shaft 39. The timer relay was so set that there was a total dwell of 8 seconds at the respective preheating and welding stations. Of course, the time of dwell can be regulated as desired by adjusting the timer.

It will be understood that, without departing from the spirit of the invention, other work-indexing mechanism for periodically moving the work to each successive work station and maintaining it there for a selected time can be substituted for the Geneva motion mechanism and associated parts described. For example, the indexing mechanism described in the Wagner patent No. 2,301,763 can be used. Furthermore, other means than those illustrated can be used for imparting a preselected light rolling pressure upon the molten surface of the overlay metal for inducing flow thereof into portions of the mold cavity contiguous to the surface or surfaces of the article to receive the welded-on overlay. The peripheral surface of roll 69 may be beveled or curved in any desired manner to assist in directing the flow of the molten metal in a selected direction. The mold advantageously may be made from a single piece of metal, in which case it is secured upon the table P.

The invention is susceptible of modification within the scope of the appended claims.

I claim:

1. In apparatus for applying a welded-on overlay of a protective metal upon an uppermost surface and at least two contiguous lateral surfaces of a metal article, which apparatus comprises a rotatable table; a plurality of heat-resistant work supports in spaced relation on said table; means for intermittently moving said table a selected distance along a fixed path and for discontinuing such movement after a selected time interval, thereby defining at least one work preheating station and a welding station visited in turn by successive work supports; and torch means at each such station for directing welding heat upon said article and upon a body of protective metal carried by said article; the improvement which comprises means for applying to the free surface of a globule of molten overlay metal on the moving article leaving the welding station a gentle rolling force sufficient only for redistributing the molten overlay metal on such article, said last-named means including a rotatable member having its peripheral surface at least as wide as the said uppermost surface of the article and disposed in the path of travel of the body of molten metal carried by each such article leaving said welding station, thereby forming a relatively smooth welded-on layer of selected, substantially uniform thickness upon said uppermost surface and upon contiguous portions of at least two lateral surfaces of such article.

2. In apparatus for applying a welded-on overlay of a protective metal upon an uppermost surface and at least two contiguous lateral surfaces of a metal article, which apparatus comprises a rotatable table; a plurality of heat-resistant work supports in spaced relation on said table; means for intermittently moving said table a selected distance along a fixed path and for discontinuing such movement after a selected time interval, thereby defining at least one work preheating station and at least one welding station visited in turn by successive work supports; and torch means at each such station for directing welding heat upon said article and upon a body of protective metal carried by said article; the improvement which comprises rotatable yieldable means for applying to the molten surface of the overlay metal on the article leaving the welding station a gentle rolling force sufficient only for redistributing the molten overlay metal on such article, said last-named means including a rotatable member having its peripheral surface at least as wide as the said uppermost surface of the article and disposed in the path of travel of the body of molten metal carried by each such article leaving said welding station, thereby forming a relatively smooth welded-on layer of selected, substantially uniform thickness upon said uppermost surface and upon contiguous portions of at least two lateral surfaces of such article.

3. Process for providing a welded-on overlay of a protective metal upon a working surface and at least two contiguous lateral surfaces of a metal article, which comprises concurrently heating the aforesaid surfaces of the article and a solid body of selected weight of said protective metal supported upon said article to a welding temperature while said article and body of metal are carried by a refractory support with the said surfaces spaced from adjacent surfaces of said support, thereby melting the body of protective metal and forming upon said working surface a molten mass thereof of non-uniform thickness while maintaining the metal of said article in substantially unmolten form, discontinuing the heating of said article and body of protective metal and immediately thereafter, while lateral margins of the body of molten metal are unrestrained, redistributing the molten metal to form a welded-on layer of uniform thickness upon all portions of the working surface and upon contiguous portions of at least two lateral surfaces of said article by applying to the molten protective metal a rolling force sufficient only to overcome the resistance to flow of the molten metal due to its surface tension and viscosity, but insufficient to cause uncontrolled lateral splashing and loss of the molten metal, and immediately thereafter releasing such force and cooling and solidifying said molten metal in its new, welded-on location while carried by said support.

4. Apparatus for providing a welded-on overlay of a protective metal upon an uppermost working surface and at least two contiguous surfaces of a metal article, which comprises heat-resistant means for supporting such an article with the uppermost surface and contiguous surfaces of the article to receive the overlay spaced from said supporting means; means for directing welding heat concurrently upon said article and a body of overlay metal thereon; means for intermittently moving the assembly of said supporting means, the article and the overlay metal carried thereby, along a fixed path which includes said heat-applying means and for discontinuing such movement for a preselected time interval at a point within the zone of said heat-applying means, and for moving such assembly from said last-named means; and molten metal redistributing means including a rotatable member disposed adjacent said heat-applying means at a point within the path of travel of said molten overlay metal beyond said heat-applying means in the direction of movement of said assembly for applying upon the molten surface of the overlay metal on an article leaving the zone of said heat-applying means a rolling force sufficient only to overcome the surface tension and viscosity of the molten overlay metal and to redistribute such metal to form a welded-on layer thereof of uniform selected thickness upon all portions of said uppermost working surface and upon contiguous lateral surfaces of said article, said rotatable member having a peripheral surface at least as wide as the said uppermost surface of said metal article.

5. Apparatus for providing a welded-on overlay of a protective metal upon an uppermost surface and at least two contiguous lateral surfaces of a metal article, which comprises heat-resistant means for supporting such an article with the uppermost surface and the contiguous lateral surfaces of the article to receive the overlay spaced from said support; means for directing at least one welding frame upon said uppermost surface and lateral surfaces of the article and upon a body of overlay metal carried on such uppermost surface; means adjacent said flame-directing means for briefly applying a rolling force upon the surface of the molten overlay metal supported on the said article in amount sufficient only to redistribute such metal to form a welded-on layer thereof of uniform selected thickness upon all portions of said uppermost surface and upon contiguous lateral surfaces of said article, said last-named means including a rotatable metal member having its peripheral surface at least as wide as the said uppermost surface of said metal article; means for moving successive portions of said body of overlay metal and of said peripheral surface into mutual contact; and means effective after a preselected time interval for discontinuing the exposure of the article to the welding flames and for rendering said force-applying means operative.

6. Apparatus for providing a welded-on overlay of a protective metal upon an uppermost surface and at least two contiguous lateral surfaces of a metal article, which comprises heat-resistant means for supporting such an article with the uppermost surface and contiguous lateral surfaces of the article to receive the overlay spaced from said support; means for moving the assembly of supporting means, the article and a body of overlay metal along a fixed path successively to at least one preheating station and to a welding station, torch means at each of said stations for directing a plurality of preheating and welding flames upon said article and said overlay metal; means for intermittently discontinuing movement of the assembly for a selected time while it is at each of such successive stations; and means adjacent the welding station and disposed in the path of movement of the body of overlay metal on the assembly leaving the welding station for redistributing the overlay metal to form a welded-on layer thereof of uniform thickness upon all portions of said uppermost surface and upon contiguous lateral surfaces of said article, said overlay redistributing means comprising a rotatable member having its peripheral surface movable in a path which at a point therein adjacent the welding station substantially coincides with the path of movement of the molten overlay metal of each assembly but not with the path of said article.

References Cited in the file of this patent

UNITED STATES PATENTS

| Number | Name | Date |
|---|---|---|
| 2,128,942 | Hudson | Sept. 6, 1938 |
| 2,250,561 | Wissler | July 29, 1941 |
| 2,277,571 | Wagner | Mar. 24, 1942 |
| 2,414,510 | Doyle | Jan. 21, 1947 |
| 2,429,287 | McGowan | Oct. 21, 1947 |
| 2,468,816 | Duce | May 3, 1949 |

FOREIGN PATENTS

| Number | Country | Date |
|---|---|---|
| 534,479 | France | Jan. 6, 1922 |